United States Patent [19]

Bangerter et al.

[11] Patent Number: 4,525,323

[45] Date of Patent: Jun. 25, 1985

[54] ION BEAM INERTIAL CONFINEMENT TARGET

[75] Inventors: Roger O. Bangerter, Danville; Donald J. Meeker, Livermore, both of Calif.

[73] Assignee: The United States of America as represented by the United States Department of Energy, Washington, D.C.

[21] Appl. No.: 821,940

[22] Filed: Aug. 4, 1977

[51] Int. Cl.³ .............................................. G21B 1/00
[52] U.S. Cl. ...................................... 376/106; 376/152
[58] Field of Search ...................... 176/1; 376/106, 152

[56] References Cited

U.S. PATENT DOCUMENTS

| | | | |
|---|---|---|---|
| 3,303,097 | 2/1967 | Mallinckrodt | 176/1 |
| 3,953,617 | 4/1976 | Smith et al. | 176/1 |
| 4,003,007 | 1/1977 | Stewart | 176/1 |
| 4,021,253 | 5/1977 | Budrick et al. | 176/1 |
| 4,021,280 | 5/1977 | Rinde et al. | 176/1 |

FOREIGN PATENT DOCUMENTS 2548446  5/1976  Fed. Rep. of Germany ......... 176/1

OTHER PUBLICATIONS

UCRL-51609, 7/74, Sourers et al., pp. 1-14.
ANS Trans., vol. 21, 6/75, pp. 18, 19.
UCLR-77725, 5/76, pp. 1-7.
1954 U.S. Code Congressional and Administrative News, pp. 3466, 3467, 3480, 3532.
Legislative History of the Atomic Energy Act of 1954, vol. II, pp. 1759, 2305, 2373, 2374.
Legislative History of the Atomic Energy Act of 1954, vol. III, pp. 2849, 2859.
Nuclear Fusion, vol. 10, 1970, by Linhart, pp. 211, 212, 222, 225, 226.
Popular Science, Dec. 1976, pp. 66-71, 148, 150.
Laser Focus, 5/77, p. 6.
Science, vol. 188, 4/75, pp. 30-34.
New York Times, Jan. 30, 1973, p. 21.
Fortune, Dec. 1974, pp. 149, 152.
Nuclear News, 3/78, pp. 30-35.
FTD-HT-66-422, 3/67, by Chao et al., pp. 1-9.
National Defense, May-Jun. 1975, pp. 467-470, by Stowe.
Nature, vol. 258, Dec. 11, 1975, pp. 512-514.
Marwick, "Exploding Reactors for Power", 1/73, pp. 9, 10, 16-34, 37, 38, 40.
Physical Review Lett., 1/73, p. 89, Clarke et al.
UCRL-50021-76, 6/77, pp. (4-29)-(4-51).
Physics Today, 3/75, pp. 17, 18.
Rev. Sci. Instrum., vol. 45, No. 10, 10/74, pp. 1245-1252, Friedman et al.
UCRL-74345, Rev. 1, 7/73, Nucholls, pp. 1-8, 15, 29.
Nuclear Fusion, vol. 14, No. 4, 9/74, pp. 511-515, Lindl.
Physical Review Letters, 9/75, vol. 35, No. 13, pp. 848-851, Clauser.
SAND 76-5122, Nov. 3-6, 1975, pp. 158-170.
Nuclear Fusion, 4/75, pp. 333-335.
IAEA-CN-33/F5-5, Nov. 11-15, 1974.
Laser Focus, 12/74, pp. 40-43.
Nuclear Fusion, 15, 12/75, pp. 1183-1184.
National Defense, May-Jun. 1978, pp. 538-543, 580, 581, 582, 584.

Primary Examiner—Harvey E. Behrend
Attorney, Agent, or Firm—L. E. Carnahan; Roger S. Gaither; Judson R. Hightower

[57] ABSTRACT

A target for implosion by ion beams composed of a spherical shell of frozen DT surrounded by a low-density, low-Z pusher shell seeded with high-Z material, and a high-density tamper shell. The target has various applications in the inertial confinement technology. For certain applications, if desired, a low-density absorber shell may be positioned intermediate the pusher and tamper shells.

3 Claims, 5 Drawing Figures

ION BEAM INERTIAL CONFINEMENT TARGET

The invention described herein was made at the Lawrence Livermore Laboratory under Contract No. W-7405-ENG-48 between the United States Energy Research and Development Administration and the University of California.

BACKGROUND OF THE INVENTION

This invention relates to targets for implosion by an energy source, and more particularly to a fusion target compatible with ion beam implosion techniques.

In recent years much effort has been directed to inertial confinement fusion involving the development of implosion apparatus and targets for implosion by energy sources, such as lasers and electron beam machines. More recently, development efforts have been directed toward ion beam implosion of fusion targets, thus establishing a need for targets compatible with ion beam technology.

While development efforts in the field of magnetic confinement have been carried on for at least two decades to develop a fusion power reactor, inertial confinement fusion (implosion of a fusion target be an energy source) efforts are relatively recent. For example, U.S. Pat. No. 3,378,446 to J. R. B. Whittlesey represents an early effort in inertial confinement to develop apparatus using lasers to trigger thermonuclear reactions whereby laboratory testing of fusionable materials in small quantity could be carried out. U.S. Pat. No. 3,489,645 issued Jan. 13, 1970 to J. W. Daiber et al is directed to a method of creating a controlled nuclear fusion reaction by repeatably imploding fusion targets by laser energy within an explosion chamber. U.S. Pat. No. 3,624,239 issued Nov. 30, 1971 to A. P. Fraas is directed to a pulsed laserignited thermonuclear reactor in which a fusion fuel target is imploded by a laser within a void in liquid lithium contained within a pressure vessel. U.S. Pat. No. 3,723,246 issued Mar. 27, 1973 to M. J. Lubin is directed to a plasma production apparatus having target production means and laser implosion means. U.S. Pat. No. 3,762,992 issued Oct. 2, 1973 to J. C. Hedstrom involved a DT target imploded by a laser wherein the neutron energy is dissipated in a lithium blanket to produce tritium, with the heat transferred to a thermodynamic plant as known in the art. U.S. Pat. No. 3,899,681 issued Aug. 12, 1975 to E. H. Beckner et al teaches an electron beam device for imploding hollow targets. In addition, various papers have been presented in this field as exemplified by "Fusion Power By Laser Implosion" by J. L. Emmett et al, Scientific American, June 1974; "Laser-Induced Thermonuclear Burn" by J. Nuckolls et al, Physics Today, August 1973; and "Laser Compression of Matter to Super-High Densities: Thermonuclear (CTR) Applications" by J. Nuckolls et al, Nature, Vol, 239, No. 5368, pp. 139-142, Sept. 15, 1972.

Also substantial effort has been directed to various components of the implosion system as evidenced by U.S. Pat. No. 3,723,703 issued Mar. 27, 1973 to K. W. Ehlers et al directed to a laser alignment and firing system for creating and heating a plasma by imploding targets; U.S. Pat. No. 4,017,163 issued Apr. 12, 1977 to A. J. Glass directed to angle amplifying optics for directing laser energy onto a target located within an explosion chamber; and U.S. Pat. No. 3,892,970 issued July 1, 1975 to J. R. Freeman et al directed to a realivistic electron beam device for producing a plasma therein; and a paper "Laser Fusion Target Illumination System" by C. E. Thomas, Applied Optics, Vol. 14, No. 6, June 1975.

Various target designs have been proposed for laser, electron beam, and ion beam implosion techniques as exemplified by "A 1964 Computer Run On A Laser-Imploded Capsule" by R. E. Kidder, UCID-17297 dated Mar. 25, 1973; "Implosion, Stability, And Burn Of Multishell Fusion Targets" by G. S. Fraley et al presented at The Fifth I.A.E.A. Conference on Plasma Physics and Controlled Nuclear Fusion Research, Tokyo, Japan, Nov. 11-15, 1974 as Paper IAEA-CN-33/F55 (LAUR-5783-MS); "Structured Fusion Target Designs" by R. C. Kirkpatrick et al, Nuclear Fusion 15, April 1975, pp. 333-335; "Target Compression With One Beam" by G. H. McCall et al, Laser Focus, December 1974, pp. 40-43; "Electrically Imploded Cylindrical Fusion Targets" by W. S. Varnum, Nuclear Fusion 15, December 1975, pp. 1183-1184; "The Calculated Performance Of Structured Laser Fusion Pellets" by R. J. Mason, Nuclear Fusion 15, December 1975, pp 1031-1043; "Low Power Multiple Shell Fusion Targets for Use With Electron And Ion Beams" by J. D. Lindl et al, International Topical Conference on Electron Beam Research, Albuquerque, New Mexico, Nov. 3-6, 1975 (UCRL-77042); "Stability and Symmetry Requirements of Electron and Ion Beam Fusion Targets" by R. O. Bangerter et al, International E-Beam Conference, Albuquerque, N.M., Nov. 3-6, 1975 (UCRL-77048); and "Fusion Targets Designed to Match Present Relativistic Electron Beam Machine Parameters" by D. J. Meeker et al, The American Physical Society Meeting, Plasma Physics Division, St. Petersburg, Fla., Nov. 10-14, 1975 (UCRL-77045).

The production of fusion neutrons by inertial confinement (implosion) techniques have been experimentally verified, thus verifying the accuracy of computer codes used, as exemplified by "Thermonuclear Fusion Research With High-Power Lasers" by R. R. Johnson et al, Vacuum Technology, May 1975, pp. 56-61 and 64; "Laser Fusion Experiments At The Lawrence Livermore Laboratory" by H. G. Ahlstrom, Gordon Research Conference On Laser Plasma Interaction With Matter, Tilton, N.H., Aug. 18-23, 1975 (UCRL-77094); "Status of Laser Fusion" by J. H. Nuckolls, American Physical Society Meeting, St. Petersburg, Fla., Nov. 10-14, 1975 (UCRL-77056); "Laser Fusion Overview" by J. Nuckolls, Ninth International Quantum Electronics Conference, June 14-18, 1976, Amsterdam, The Netherlands (UCRL-77725); "Electron Beam Fusion Pellets" by W. P. Gula et al, Proceedings of the International Topical Conference on Electron Beam Research and Technology, Nov. 3-6, 1975, Albuquerque, N. Mex. pp. 158-170 (SAND76-5122); and "Behavior of Double Shelled Electron Beam Fusion Targets" by W. P. Gula, Bulletin of the APS, 21, 1195, 1976 (LAUR76-2343).

Target fabrication techniques are at an advanced state of development with numerous mechanisms and processes having been developed, as exemplified by above-referenced U.S. Pat. No. 3,723,246 to M. J. Lubin; as well as U.S. Pat. No. 3,907,477, issued Sept. 23, 1975 to T. R. Jarboe et al; U.S. Pat. No. 3,953,617 issued Apr. 27, 1976 to W. H. Smith et al; U.S. Pat. No. 3,985,841 issued Oct. 12, 1976 to R. J. Turnbull et al; and U.S. Pat. No. 4,012,265 issued Mar. 15, 1977 to J. A. Rinde et al. In addition numerous publications such as paper "Fabrication and Characterization of Laser Fusion Targets" by C. D. Hendricks et al, American Physical Society, Division of Plasma Physics, Nov. 10–14, 1975, St. Petersburg, Fla. (UCRL-76679); and report UCRL-50021-75 "Laser Program Annual Report-1975", Lawrence Livermore Laboratory, Univ. of Cal., Section 7 "Target Fabrication", pp. 343–368, have been prepared in the field of target fabrication.

Thus, while commercial fusion power reactors are still some distance away, the inertial confinement technology has rapidly advanced such that $10^9$ fusion neutrons are being produced by existing implosion systems which systems currently provide an excellent source of neutrons, X-rays, alpha particles which has not been previously available to the scientific community for physics studies, radiography, synthetic fuel production, fissile fuel production, tritium production, and radioisotope production, etc. In addition, the energy produced by the implosion of the targets via inertial confinement techniques can be utilized for propulsion applications, process heat production, burning of actinide wastes, etc. Therefore, while fusion power for electrical production has not yet been accomplished, the inertial fusion techniques developed thus far have greatly advanced the state of the art.

With the recognition by the scientific community that inertial fusion has been accomplished, substantial effort is now being directed towards a prototype inertial confinement fusion reactor wherein various systems (laser, e-beam, ion-beam, etc.) are being developed to produce the energy required to implode the targets required for these forthcoming inertial fusion reactor systems. In addition substantial effort is being directed toward development of targets compatible with these energy systems.

In designing ion beam targets suitable for commercial power production, the following criteria are of importance:

1. The target should be cheap; hence, it should be of inexpensive materials, it should be simple to fabricate, and it should be relatively insensitive to fluid instabilities to minimize the precision required in its construction.
2. The target should produce minimum residual radioactivity.
3. The target should have a high gain (energy yield/beam energy) to minimize recirculating power costs in the power plant.
4. The target should have low beam-power and energy requirements.
5. The target should have a large tolerance to irradiation asymmetries.
6. The target should be insensitive to preheat effects.

However, many of the above-listed criteria impose contradictory constraints on target design. For example, power requirements can be lowered by using high-aspect-ratio (radius/shell thickness) shells or multiple-shell designs; but, such targets are relatively unstable and usually have high irradiation symmetry requirements.

SUMMARY OF THE INVENTION

The present invention is directed to an ion-beam target that satisfies many of the above requirements. The principal feature of this target is the low-density, low-Z pusher material or layer that is located between the high-Z tamper and the fuel. In addition this target is made of inexpensive material and can be readily fabricated by existing technology.

The high density tamper serves as a confinement shell to increase the efficiency of the implosion. The pusher shell is seeded with some high-Z material which serves to inhibit energy transport into the fuel and thus prevents preheat thereof. The low-density, low-Z pusher enables one to achieve the following conditions: The pusher can be relatively thick to decrease the fluid instability problem and yet contain relatively little mass. The problem of fluid instabilities causing pusher-fuel mixing during the final stages of the implosion is ameliorated relative to a high density pusher because of the small density difference between fuel and pusher.

Therefore, it is an object of this invention to provide a target for implosion by at least one ion beam.

A further object is to provide an ion-beam inertial confinement fusion target which utilizes a low-density, low-Z pusher shell.

Another object of the invention is to provide a fusion target which overcomes the problems associated with similar targets using a high density pusher.

Another object of the invention is to provide a target for inertial confinement fusion applications by ion-beam energy which utilizes a low-density, low-Z pusher located between a high-Z tamper and the fuel.

Another object of the invention is to provide a target for implosion by ion beams which utilizes a low-density, low-Z pusher seeded with high-Z material.

Other objects of the invention will become readily apparent to those skilled in the art from the following description and accompanying drawings.

DESCRIPTION OF THE INVENTION

The present invention is an ion-beam fusion target, described in greater detail hereinafter, but basically consisting of a spherical shell of frozen DT surrounded by a low-density, low-Z pusher seeded with high-Z material, and a high-density, high-Z tamper (see FIG. 1). As pointed out above, this target satisfies many of the requirements or criteria for inertial confinement type commercial power production applications, although it can be also effectively utilized in the other various applications described above. Also, it is again noted that the principal feature of this target is the low-density, low-Z pusher instead of the prior known high-density, high-Z pusher. In addition, this target is composed of inexpensive material and can be readily fabricated by existing technology.

The high-density tamper, such as Pb in the illustrated embodiment, serves as a confinement shell to increase the efficiency of the implosion. The pusher material, such as TaCOH, shown in the illustrated embodiment, is $CH_2$ that has been seeded with a high-Z material, such as tantalum oxide, and is thus a a low-density, low-Z material. The tantalum in the illustrated embodiment constitutes only about 1 atomic percent (at %) of the pusher, but this is sufficient to inhibit energy transport into the fuel, preventing preheat. Because of its low-density, the pusher can be relatively thick to decrease the fluid-instability problem and yet contain little mass. In addition, the fluid instabilities causing pusher-fuel mixing during the final stages of the implosion are ameliorated as a result of the small density difference between fuel and pusher. Calculations typically give Atwood numbers much less than 1 across the pusher-fuel interface during the final stages of the implosion. In some cases, the fuel actually becomes denser than the pusher, resulting in a stable condition. Even where some mixing does occur low-Z materials cause less burn degradation than high-Z materials.

Figure 1:
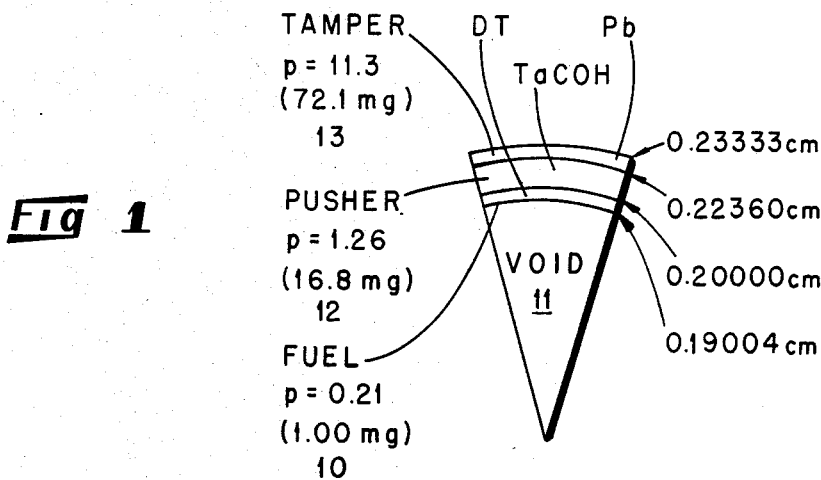
FIG. 1 illustrates an embodiment of an ion-beam target made in accordance with the present invention.

In calculations involving high-Z pushers, utilized in previously known targets which are composed of a shell of fuel surrounded by a high-Z pusher material, such as gold (Au), the density times radial thickness ($\rho r$) of the pusher in targets comparable to the embodiment illustrated in FIG. 1 is roughly 10 g/cm$^2$ during thermonuclear burn. In the target of this invention, the bulk of the high-Z material remains uncompressed at a large radius. The total $\rho r$ of the high-Z material in both the pusher and tamper is less than 1 g/cm$^2$. Thus, the low-Z pusher target produces less than 10% as much high-Z radioactive debris as a target with a high-Z pusher.

Figure 2:
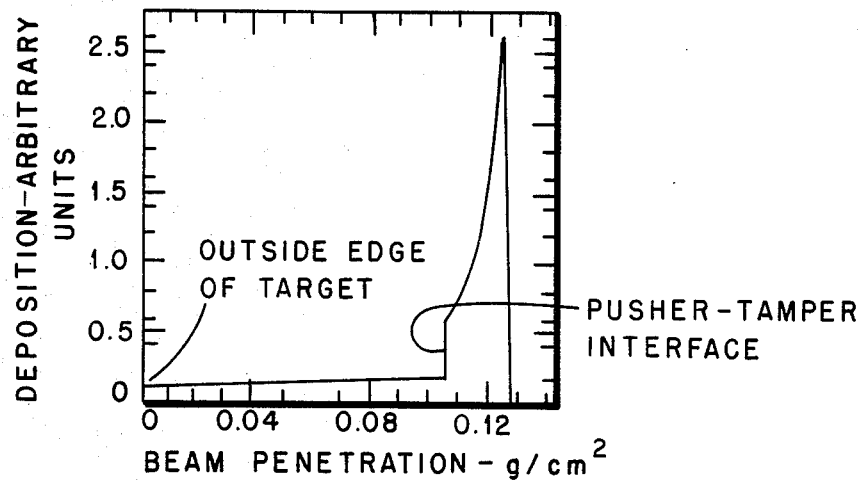
FIG. 2 graphically illustrates a deposition profile of the FIG. 1 target.

Low-Z materials stop ions more effectively than do high-Z materials. Thus the ion-beam energy is preferentially deposited in the pusher region where it is most effective (see FIG. 2) the curve in FIG. 2 was calculated for 6.5 MeV protons at temperatures and densities occurring 18 ns into the implosion, a typical temperature in the deposition media being in excess of 200 eV.

Figure 3:
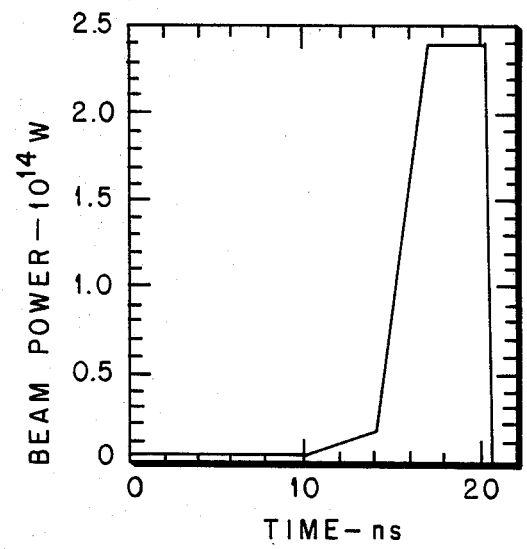
FIG. 3 graphically illustrates beam power as a function of time.

To achieve high gain, fuel must be efficiently compressed and only the central portion ignited. A radially propagating burn ignites the remainder of the fuel. These two conditions are achieved by using the pulse shape shown in FIG. 3.

Figure 4:
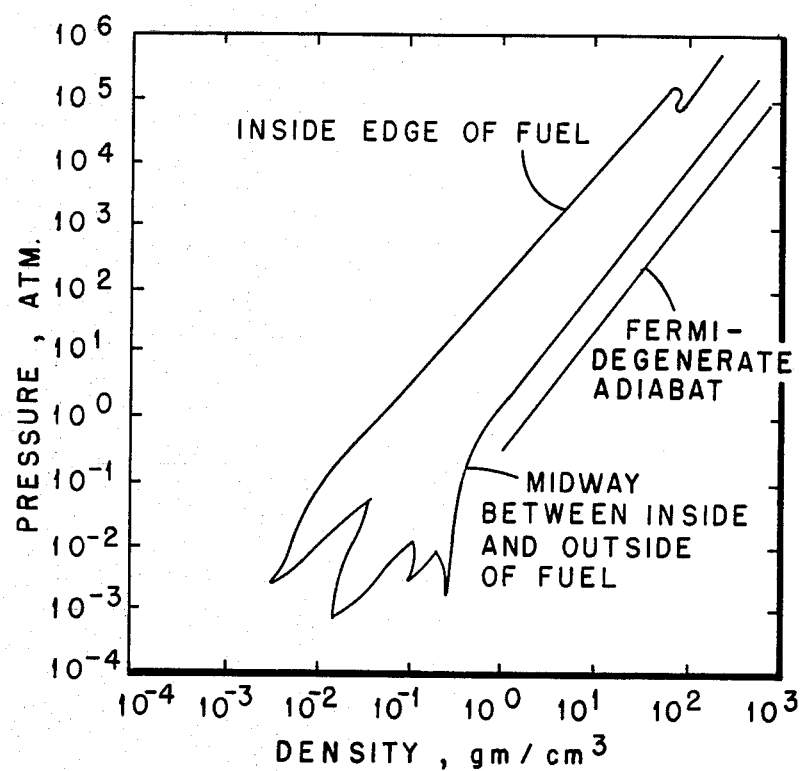
FIG. 4 graphically illustrates pressure as a function of density in the fuel.

FIG. 4 is a plot of pressure as a function of density at the innermost portion of the fuel and at radial distance containing roughly one-half of the fuel. The zero temperature Fermi-degenerate pressure is shown for comparison. It is evident that most of the fuel has been compressed relatively efficiently while the central part of the fuel has been placed on a high adiabat and driven to ignition.

Figure 5:
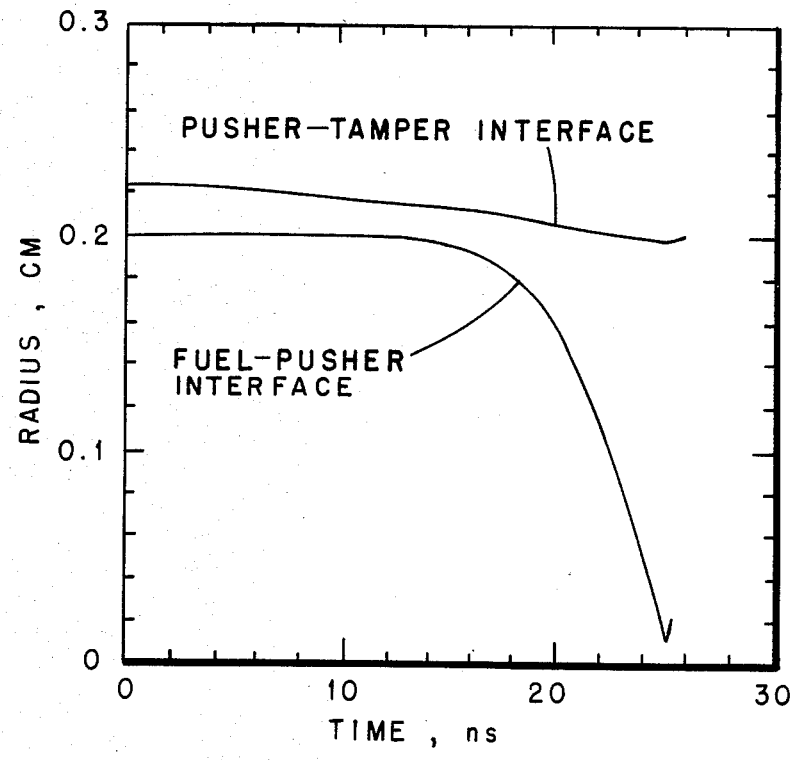
FIG. 5 graphically illustrates radius as a function of time.

Plots of radius as a function of time are shown in FIG. 5. The maximum velocity of the pusher-fuel interface is 33 cm/$\mu$ sec.

Referring now to FIG. 1, the illustrated embodiment of the target comprises a central hollow shell of fuel 10 defining therein a void 11, a pusher shell 12 surrounding fuel shell 10, and a tamper shell 13 surrounding pusher shell 12. As shown in FIG. 1, the fuel 10 is composed of deuterium-tritium (DT) having a density of 0.21 gm/cm$^3$ mass of 1.00 mg, an inner radius of 0.19004 cm, an outer radius of 0.20000 cm, forming a wall thickness of 0.00996 cm; pusher 12 is composed of TaCOH having a density of 1.26 gm/cm$^3$, mass of 16.8 mg, inner radius of 0.20000 cm, outer radius of 0.22360 cm, forming a wall thickness of 0.02360 cm; with tamper 13 composed of lead (Pb) having a density of 11.3 gm/cm$^3$, mass of 72.1 mg., inner radius of 0.22360 cm, outer radius of 0.23333 cm, and wall thickness of 0.009973 cm.

While specific parameters and materials of the FIG. 1 embodiment of the target have been described and/or illustrated, the fuel 10 can also be composed of any other thermonuclear fuel such as DD, LiD, etc., but such fuels impose more difficult requirements on ion beam power and energy.

The quantity of fuel as well as other parameters such as tamper thickness can range over large limits depending on such things as ion beam voltage, power and energy and desired target yield.

The tamper can be composed of any dense material (density of 0.5 to 25 gm/cm$^3$), for example, 0.5 gm/cm$^3$ is dense compared to DT. In addition to the above-detailed embodiment the tamper could be composed of materials selected from the group consisting of Pb, Fe, Cu, W, Ag, Ta, Au and any other high Z material.

The pusher and intermediate layer can be any low Z material. Seeding material can be nearly anything also. In addition to the above-detailed embodiment the pusher could be composed of materials selected from the group consisting of Ta, COH, Li, Be, B, C or any other low Z material seeded with Ta, W, Pb, Au, Fe, Cu or any high-Z material.

The densities of these layers range from 0.07 gm/cm$^3$ to 10 gm/cm$^3$. Z of the pusher ranges from 1 to 30 and of the seeding material from 2 to 92, or greater if one wants to use man-made elements. One can also use mixtures of elements. The basic idea is that anything works as long as the tamper is denser than the pusher.

The overall gain of the FIG. 1 target is 88. The energy output is 113 MJ; the energy input is 1.28 MJ at a peak power of $2.4 \times 10^{14}$ Watts. It is understood that the illustrated target can be readily scaled to different sizes and ion-beam voltages.

By way of comparison, the performance of the FIG. 1 target has been compared with a high-Z pusher target composed of a hollow shell of DT having a density of 0.21 gm/cm$^3$, inner radius of 0.190 cm, and outer radius of 0.200 cm; and a high-Z pusher composed of gold (Au) having a density of 19.3 gm/cm$^3$, an inner radius of 0.200 cm, and an outer radius of 0.221–0.223 cm; imploded by an unshaped ion beam pulse of 600 TW. A detailed comparison of the FIG. 1 target and the high-Z pusher target is given in Table I.

TABLE I

| Target | Input Energy (MJ) | Output Energy (MJ) | Peak Input Power (TW) | Target Gain |
|---|---|---|---|---|
| Low-Z Pusher | 1.28 | 113 | 240 | 88 |
| High-Z Pusher | 7.2 | 247 | 600 | 34 |

Two dimensional LASNEX code calculations show the stability of the low-Z pusher to be superior to that of the high Z target. The accuracy of the LASNEX code has been verified by actual implosion experiments (see above-referenced papers UCRL-77056, UCRL-77094, and UCRL-77725), thus unquestionably establishing the code as an effective tool for target design, and thus each target configuration or modification thereof need not be actually imploded to establish the energy produced thereby or energy required to implode same.

It has thus been shown that the target of the present invention satisfies many of the requirements for commercial power production by ion-beam fusion, by positioning a layer or shell of low-density, low-Z pusher material seeded with high-Z material between a hollow shell of fuel and a high density tamper. This low-density, low-Z pusher target produces results substantially greater than the targets using a high-Z pusher.

While FIG. 1 illustrates a specific embodiment of the invention, it is not intended to limit the invention to the specific materials and parameters illustrated in that embodiment, since as pointed out above, other materials and parameters can be used. Also, if desired for certain applications, the abovedescribed target can be modified by placing a low-density absorber layer between the pusher and the tamper.

It has thus been shown that the target of the present invention substantially advances the state of the ion-beam targets for the inertial fusion applications exemplified above.

While a particular embodiment of the invention has been described, modifications and changes will become apparent to those skilled in the art, and it is intended to cover in the appended claims all such modifications and changes as come within the spirit and scope of this invention.

We claim:

1. In a system comprising means for extracting useful energy in a controlled manner from a target imploded by energy from at least one ion beam, said target having a centrally located quantity of fusion fuel which gives off useful energy in a controlled manner when imploded by ion beam energy, the improvement consisting of: a pusher consisting of TaCOH positioned substantially contiguously about said fuel, said pusher inhibiting energy transport into said fuel and preventing preheat of said fuel, said pusher while containing relatively little mass and because of a small density difference between said fuel and said pusher functioning to decrease fluid instabilities caused by pusher-fuel mixing during final stages of implosion of the fuel; and a tamper surrounding and substantially contiguous about said pusher, said tamper consisting of Pb, said pusher of TaCOH includes about 1 atomic percent of tantalum, said tamper and said tantalum of said pusher having a combined total density times radial thickness ($\rho r$) of less than 1 gm/cm$^2$.

2. The improvement defined in claim 1, wherein said quantity of fuel consists of a shell of frozen DT.

3. The improvement defined in claim 1, wherein said fuel has a density of about 0.21 gm/cm$^3$, a mas of about 1.00 mg, an inner radius of about 0.19004 cm and an outer radius of about 0.2000 cm; wherein said pusher has a density of about 1.26 gm/cm$^3$, a mass of about 16.8 mg, an inner radius of about 0.20000 cm, and an outer radius of about 0.22360 cm; and wherein said tamper has a density of about 11.3 gm/cm$^3$, mass of about 72.1 mg, inner radius of about 0.22360 cm, and an outer radius of 0.23333 cm.

* * * * *